(12) United States Patent
Gysling et al.

(10) Patent No.: US 8,402,841 B2
(45) Date of Patent: Mar. 26, 2013

(54) APPARATUS AND METHOD FOR SENSING FLUID FLOW IN A PIPE WITH VARIABLE WALL THICKNESS

(75) Inventors: Daniel L. Gysling, Glastonbury, CT (US); Patrick Curry, Glastonbury, CT (US); ChangJiu Dang, Cheshire, CT (US)

(73) Assignee: Expro Meters, Inc., Wallingford, CT (US)

( * ) Notice: Subject to any disclaimer, the term of this patent is extended or adjusted under 35 U.S.C. 154(b) by 194 days.

(21) Appl. No.: 13/046,259

(22) Filed: Mar. 11, 2011

(65) Prior Publication Data

US 2011/0226063 A1    Sep. 22, 2011

Related U.S. Application Data

(60) Provisional application No. 61/320,130, filed on Apr. 1, 2010, provisional application No. 61/312,950, filed on Mar. 11, 2010.

(51) Int. Cl.
*G01F 1/66* (2006.01)
(52) U.S. Cl. .................................................. 73/861.27
(58) Field of Classification Search ............... 73/861.18, 73/861.27, 861.28, 623; 310/323.01; 374/47
See application file for complete search history.

(56) References Cited

U.S. PATENT DOCUMENTS

| | | | | |
|---|---|---|---|---|
| 3,558,936 A | * | 1/1971 | Horan | 310/323.01 |
| 3,633,403 A | * | 1/1972 | McDonald et al. | 374/47 |
| 7,389,187 B2 | | 6/2008 | Kersey et al. | |

* cited by examiner

*Primary Examiner* — Jewel V Thompson
(74) *Attorney, Agent, or Firm* — O'Shea Getz P.C.

(57) ABSTRACT

A method and apparatus for sensing a fluid flow within a pipe is provided. The method includes the steps of: a) providing an ultrasonic sensor having a transmitter operable to transmit ultrasonic signals through the first pipe wall, the fluid flow disposed within the pipe, and the second pipe wall, and a receiver operable to receive the transmitted signal after the signal has passed through the pipe walls and fluid flow; b) disposing the transmitter adjacent the first wall and the receiver adjacent the second wall; c) disposing at least one acoustic member between at least one of the transmitter and the first wall, and the receiver and the second wall, which acoustic member has acoustic properties such that the combined respective member and pipe wall have half wave resonant frequencies that substantially match the half wave resonant frequencies of the opposite wall, or opposite wall and respective member; and d) sensing the fluid flow through the pipe walls and structure using the ultrasonic sensor.

20 Claims, 6 Drawing Sheets

APPARATUS AND METHOD FOR SENSING FLUID FLOW IN A PIPE WITH VARIABLE WALL THICKNESS

The present application is entitled to the benefit of and incorporates by reference essential subject matter disclosed in U.S. Provisional Patent Application Ser. Nos. 61/312,950, filed Mar. 11, 2010, and 61/320,130, filed Apr. 1, 2010.

BACKGROUND OF THE INVENTION

1. Technical Field

The present invention relates to apparatus and methods for sensing fluid flow within a pipe using ultrasonic sensors in general, and to apparatus for improving signal-to-noise ratio for such sensors in particular.

2. Background Information

Normal incidence ultrasonic cross-correlation flow meters typically use pairs of ultrasonic sensors to detect modulation of ultrasonic signals transmitted through a moving media (e.g., fluid flowing within a pipe). Each pair of ultrasonic sensors includes a transmitter and a receiver. Coherent flow structures traveling within the flow cause modulation of the signals traveling through the flow. The modulation of the signals is measured at multiple axial locations and typically with multiple pairs of sensors. A signal analysis algorithm (e.g., a cross-correlation algorithm) is applied to determine the speed at which the coherent disturbances flow past the array of sensors.

Cross-correlation ultrasonic flow meters are well suited for clamp-on applications. One of the key challenges for a clamp-on ultrasonic flow meter is getting a sufficient amount of ultrasonic signal from the transmitter, through the first wall of the pipe, through the fluid passing within the pipe, through the second wall of the pipe, and to the receiver. The signal that follows the aforesaid path is typically referred to as "the fluid borne signal". The fluid borne signal is only one component of the transmitted signal that arrives at the receiver. Another, often much larger, component of the transmitted signal, is the "structural borne signal", or the "ring-around" signal. The ring-around signal travels within the pipe material and does not traverse the fluid passing within the pipe.

The ratio of the fluid borne signal component (considered the "signal" of interest for a flow meter) to the structural borne signal component (considered "noise" for a flow meter) of the arrived signal is a measure of the signal-to-noise for a flow meter application. In general, increasing the magnitude of the fluid borne signal component relative to the structural borne signal component (i.e., improving the signal-to-noise ratio) improves the operability and performance of ultrasonic flow meters.

SUMMARY OF THE INVENTION

According to an aspect of the present invention, a method of sensing a fluid flow within a pipe is provided. The pipe has a first wall oppositely disposed from a second wall. The method includes the steps of: a) providing an ultrasonic sensor having a transmitter operable to transmit ultrasonic signals through the first pipe wall, fluid flow disposed within the pipe, and the second pipe wall, and a receiver operable to receive the transmitted signal after the signal has passed through the first and second pipe walls and the fluid flow disposed within the pipe; wherein the first wall has one or more first half-wave resonant frequencies, and the second wall has one or more second half wave resonant frequencies; b) disposing the transmitter adjacent the first wall and the receiver adjacent the second wall; c) disposing at least one acoustic member between at least one of the transmitter and the first wall, and the receiver and the second wall, which acoustic member has acoustic properties such that the combined respective member and pipe wall have half wave resonant frequencies that substantially match the half wave resonant frequencies of the opposite wall, or opposite wall and respective member; and d) sensing the fluid flow through the pipe walls and structure using the ultrasonic sensor.

According to another aspect of the present invention, another method of sensing a fluid flow within a pipe is provided. The method includes the steps of: a) providing an ultrasonic sensor having a transmitter operable to transmit ultrasonic signals through the first pipe wall, the second pipe wall, and fluid flow disposed within the pipe, and a receiver operable to receive the transmitted signal after the signal has passed through the walls and the fluid flow; b) disposing the transmitter so that signals emitted from the transmitter enter the first wall as normal incident ultrasonic signals, which first wall has a thickness aligned with the transmitter; c) disposing the receiver orthogonally across the pipe to receive the emitted signals through the second wall, which second wall has a thickness aligned with the receiver; d) equalizing the thicknesses of the first and second walls where aligned with the transmitter and receiver, respectively; and e) sensing the fluid flow within the pipe using the transmitter and the receiver.

According to another aspect of the present invention, an apparatus for sensing a fluid flow within a pipe is provided. The first wall of the pipe has one or more first half wave resonant frequencies, and the second wall has one or more second half wave resonant frequencies. The apparatus includes an ultrasonic sensor and at least one acoustic member. The ultrasonic sensor has a transmitter and a receiver. The transmitter is operable to transmit ultrasonic signals through the first pipe wall, fluid flow disposed within the pipe, and the second pipe wall. The receiver is operable to receive the transmitted signal after the signal has passed through the first and second pipe walls and the fluid flow disposed within the pipe. The acoustic member is adapted to be disposed between at least one of the transmitter and the first wall, and the receiver and the second wall. The acoustic member has acoustic properties such that the combined respective acoustic member and pipe wall have half wave resonant frequencies that substantially match the half wave resonant frequencies of the opposite wall, or opposite wall and respective member.

The present method and apparatus, and advantages associated therewith, will become more readily apparent in view of the detailed description provided below, including the accompanying drawings.

DETAILED DESCRIPTION OF EMBODIMENTS OF THE INVENTION

Figure 1:
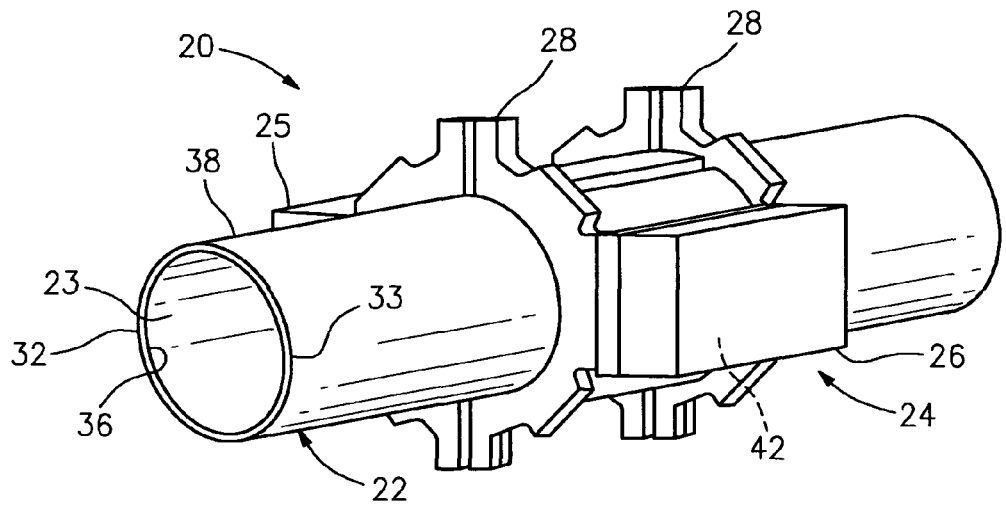
FIG. 1 is a perspective diagrammatic view of a flow meter mounted on a pipe.

Referring to FIG. 1, an ultrasonic flow meter system 20 is provided operable to be attached to the exterior of a pipe 22 containing a fluid flow 23, which system 20 is sometimes referred to as a "clamp-on" type flow meter system 20. The system 20 includes an ultrasonic flow meter 24, sensor housings 25, 26, and mounting hardware 28. For description purposes below, the sensor housing 25 is described as the "transmitter housing" and the sensor housing 26 is described as the "receiver housing". The relative position of the housings 25, 26 may be opposite that shown in FIG. 1. The pipe 22 has a diameter, a first pipe wall 32, a second pipe wall 33, an interior surface 36, an exterior surface 38, and an axial centerline.

Figure 2:
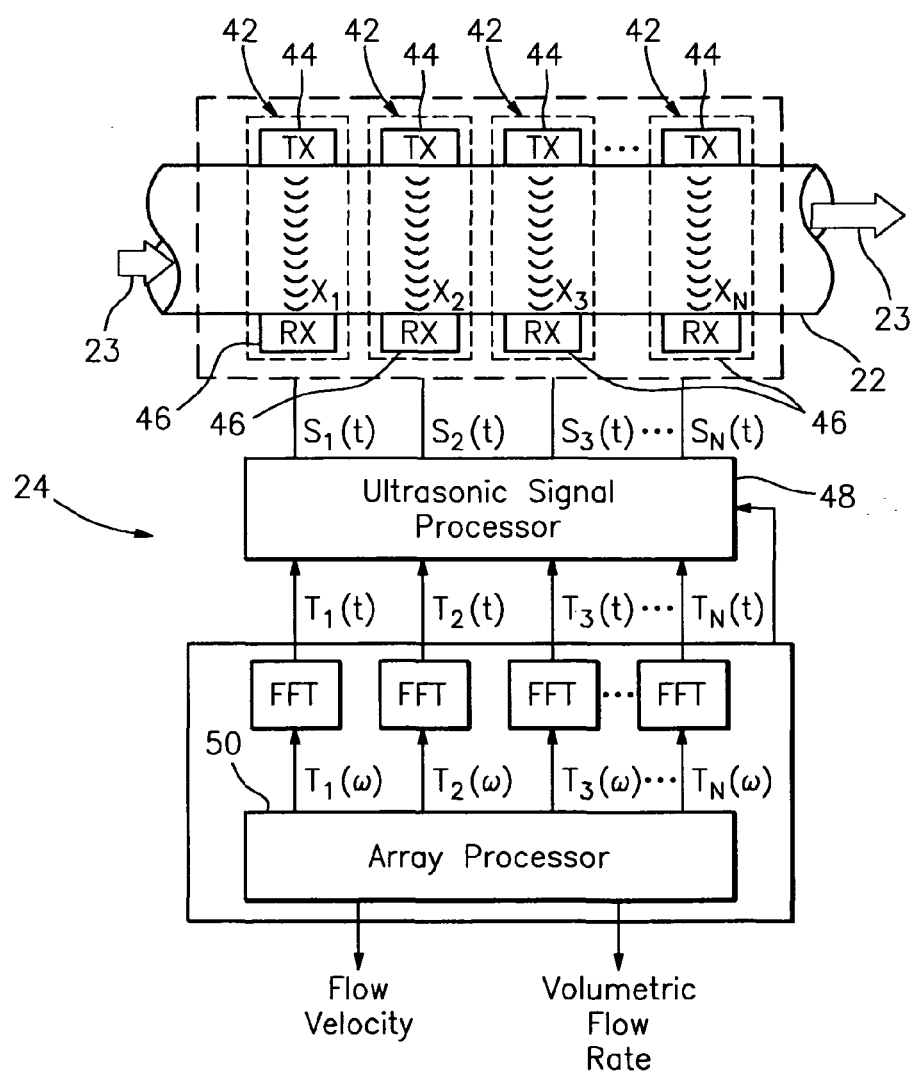
FIG. 2 is a schematic representation of a flow meter mounted on a pipe in FIG. 1.

The ultrasonic flow meter described in U.S. Pat. No. 7,389,187, which is hereby incorporated by reference in its entirety, is an example of such a device. As can be diagrammatically seen in FIG. 2, the flow meter 24 includes an array of ultrasonic sensors 42 disposed axially along the length of a pipe 22. Each ultrasonic sensor 42 comprises a transmitter 44 (TX) and a receiver 46 (RX) pair. The transmitter 44 provides an ultrasonic signal across the pipe 22 in a direction that is orthogonal to the direction of the fluid flow 23 where it is received by the corresponding receiver 46.

The signals $S_1(t)$-$S_N(t)$ received from each ultrasonic sensor 42 represent the original signal emitted from the transmitter 44, which has passed through the first pipe wall 32, through the fluid flow 23 within the pipe 22, and through the second pipe wall 33, prior to being received by the respective receiver 46. As will be described below, in some embodiments other physical structure (e.g., shoes, shims, acoustic high impedance members, etc.) may be disposed between the transmitter and receiver of a particular sensor 42. In such embodiments, the signal must also pass through the aforesaid structure prior to being received by the receiver 46 of the sensor 42. The signals $S_1(t)$-$S_N(t)$ produced by each sensor 42 are subsequently processed by an ultrasonic signal processor 48 and a signal processor 50 (having an array processor) for determining the velocity and/or volumetric flow rate of the fluid flow 23. The signal processor 50 includes array processing logic, examples of which include SONAR processing logic and cross-correlation processing logic.

As indicated above, the structural borne signal component of the received signal (i.e., the component of the received signal that provides no fluid flow information) often has a substantially larger magnitude than the fluid borne signal component of the received signal (i.e., the component of the received signal that provides fluid flow information). Consequently, an increase in the magnitude of the fluid borne signal component relative to the structural borne signal component is desirable because it improves the signal-to-noise ratio and thereby improves the operability and performance of the flow meter 24.

To increase the fluid borne signal component of the received signal, the transmitted signal is transmitted (e.g., in pulse form) at a frequency that is coincident with a resonant frequency of the pipe wall. Using a frequency that is coincident with a resonant frequency of the pipe wall results in minimal transmission loss as the signal travels through the pipe wall. A resonant frequency of a material can be determined using the following formula:

$$f_r = \frac{na}{2t}$$

where "$f_r$" is a resonant frequency, "a" is the speed of sound within the material, "n" is an integer, and "t" is the thickness of the material through which the wave travels.

Figure 3:
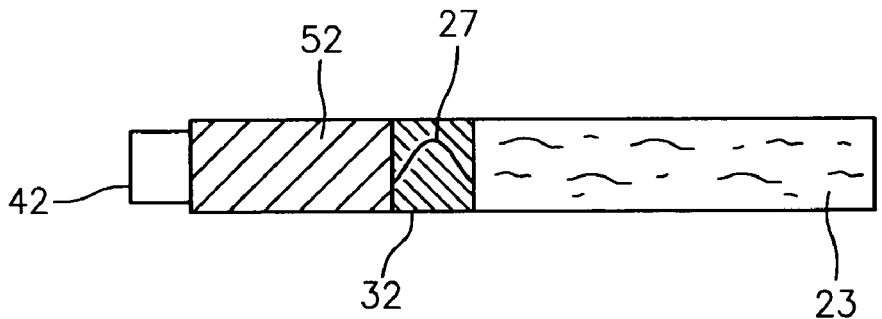
FIG. 3 is a diagrammatic representation of a sensor, a sensor shoe, a pipe wall, and a fluid flow within the pipe wall.

To illustrate, FIG. 3 diagrammatically depicts a sensor 42 mounted on a pipe, the pipe having a steel pipe wall 32 and containing fluid flow 23. A sensor shoe 52 comprised of plastic (e.g., ultem) is disposed between the sensor 42 and the pipe wall 32. The sound speed and density, and hence acoustic impedance, of the three layers (i.e., the shoe 52, the pipe wall 32, and the fluid flow 23) are known. While the detailed acoustic properties of the shoe 52 and the fluid flow 23 ultimately influence the amount of energy that can be effectively transmitted, the frequency dependent aspects of the transmission are dominated by the resonant condition of the pipe wall 32 itself.

Figure 4:
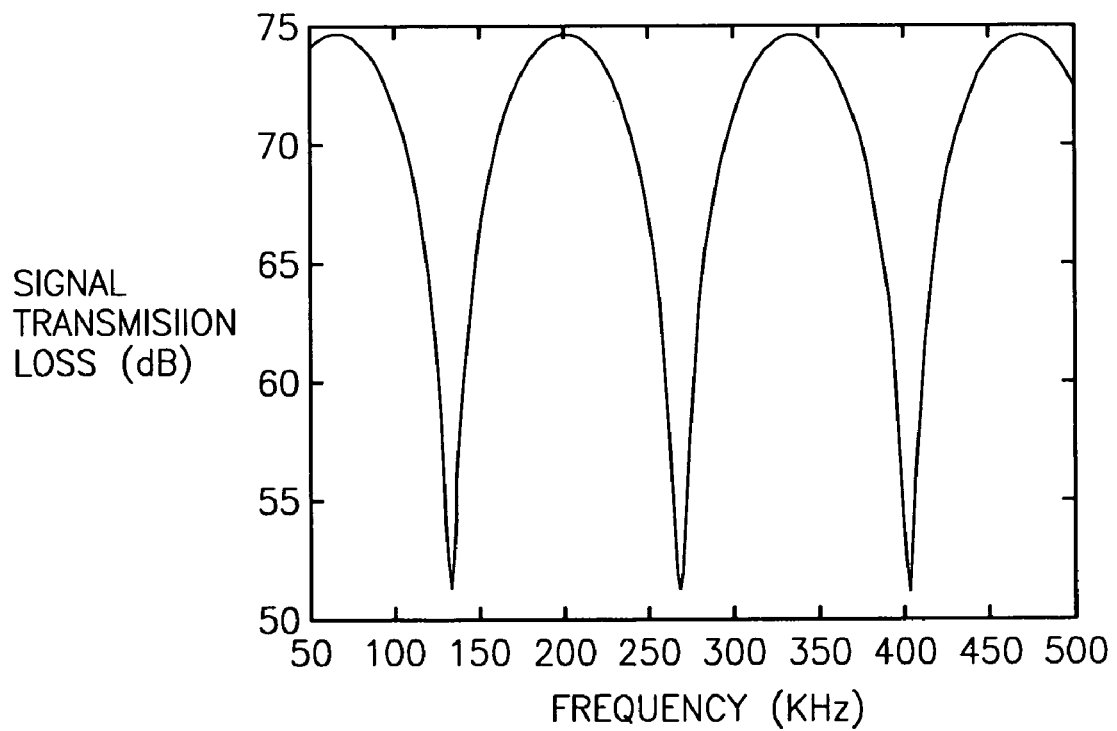
FIG. 4 is a graph of signal transmission loss versus frequency, depicting signal transmission loss for signals transmitted through the sensor-pipe wall arrangement shown in FIG. 3 over a range of frequencies.

The transmission loss for the sensor configuration shown in FIG. 3 is illustrated in the graph of FIG. 4. The graph of FIG. 4 illustrates a curve of signal transmission loss versus frequency. The results illustrated in FIG. 4 were obtained using a configuration in which the sensor shoe 52 comprised ultem, the pipe wall 32 comprised steel, and the fluid flow 23 had an internal pressure of 10 atmospheres (atms). As can be seen from FIG. 4, signal transmission loss is at a minimum at frequencies corresponding to "half wave" resonant frequencies. Under the present invention, the sensors 42 within the flow meter 24 (e.g., a pulse normal incident ultrasonic flow meter) are adapted to operate at frequencies corresponding to the aforesaid "half wave" resonant frequencies of the pipe (i.e., frequencies resulting in minimum signal transmission loss). For example, the first three "half wave" resonant frequencies of a six inch (6") schedule XXS pipe are 134 KHz, 268 KHz, and 403 KHz, respectively, assuming the schedule XXS pipe is steel and has a sound speed (i.e., "a") equal to about 5900 msec.

For steady state conditions, precisely matching the sensor 42 transmission frequencies to any of these "half wave" resonant frequencies results in the pipe wall 32 becoming essentially acoustically transparent for ultrasonic signal transmission purposes. In the example illustrated by the data in FIG. 4, the difference in transmission loss of signal 27 passing through the pipe wall 32 at "half wave" resonant frequencies, as opposed to anti-resonant, in this example approaches 25 dB, roughly a factor of 15 in amplitude and a factor of 30 in power.

For clamp-on flow metering applications, however, the fluid borne signal component of the received signal typically must pass through two pipe walls. For example, in the embodiment illustrated in FIG. 5, the fluid borne signal component must pass through a first pipe wall 32 (i.e., the "transmit wall") and a second pipe wall 33 (i.e., the "receive wall"). If the two pipe walls have equal thickness and acoustic properties, the resonant frequencies of the two walls coincide. This "balanced pipe" configuration is ideal for optimizing (i.e., increasing the magnitude of) the fluid borne signal component of the received signal. However, if the two pipe walls are un-balanced (e.g., if the two walls have different "half wave" resonant frequencies), the fluid borne signal component of the received signal can be significantly compromised.

Figure 5:
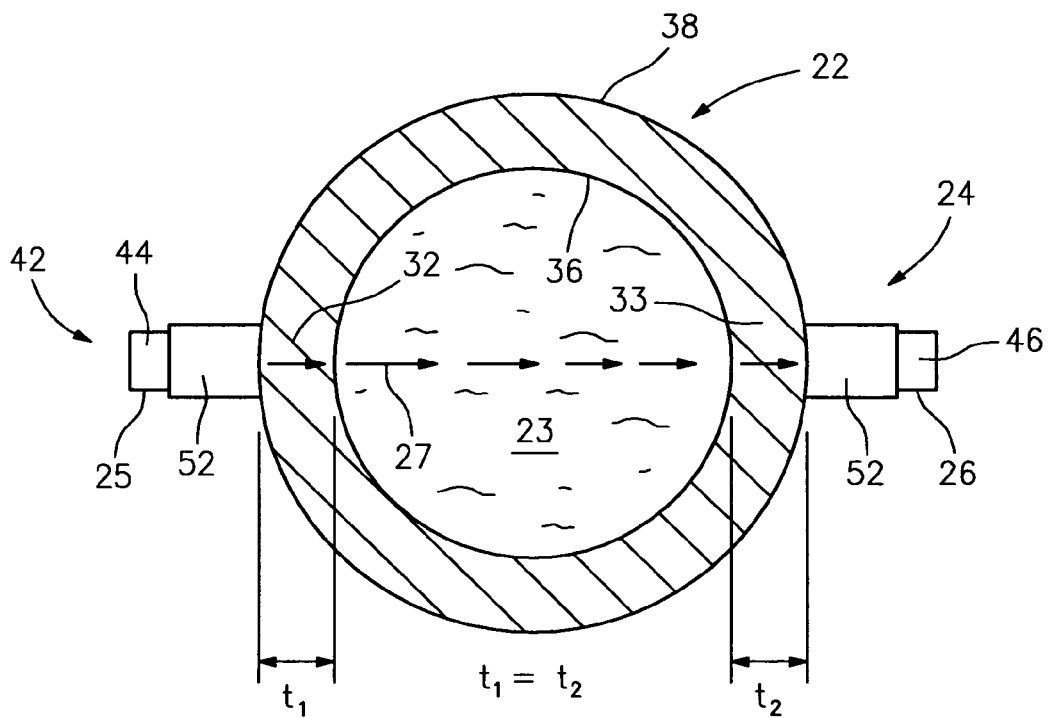
FIG. 5 is a diagrammatic illustration of a sensor having a receiver and a transmitter orthogonally mounted on a pipe, wherein a first pipe wall is aligned with the transmitter and a second pipe wall is aligned with the receiver, and the first and second pipe walls are substantially equal in thickness.
Figure 6:
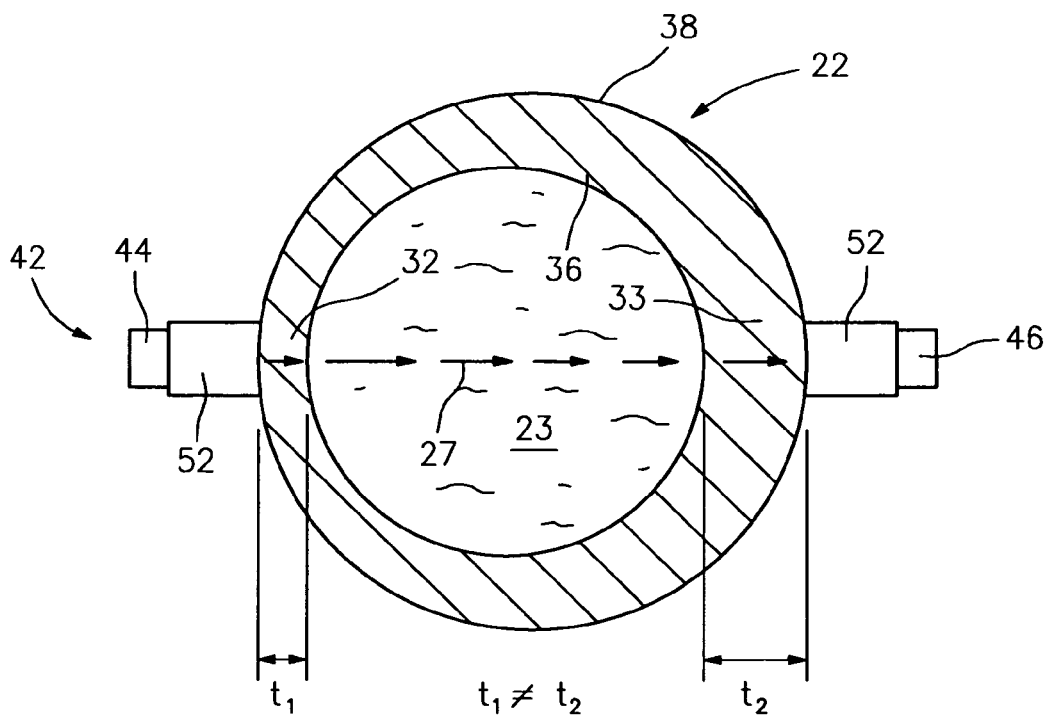
FIG. 6 is a diagrammatic illustration of a sensor mounted on a pipe like that shown in FIG. 5, with the exception that the first and second pipe walls are not substantially equal in thickness; i.e., the second pipe wall thickness is greater than the first pipe wall thickness.

FIG. 5 illustrates a "balanced pipe" configuration wherein the transmission loss can be defined as the sum of the transmission loss through the first pipe wall 32 (i.e., the "transmit wall" having a thickness=$t_1$) and the second pipe wall 33 (i.e., the "receive wall" having a thickness=$t_2$; $t_1=t_2$). FIG. 6, in contrast, illustrates an "unbalanced pipe" configuration, where the pipe is "unbalanced" because one of the pipe walls is thicker than the other pipe wall by some amount (e.g., 0.050 inches for a 6" wall; approximately 5.6% of mean wall thickness; i.e., $t_1 \neq t_2$). It should be noted that the diagrammatic illustrations of FIGS. 6, 8, and 10-12, each depicting an "unbalanced" pipe, are purposely exaggerated to facilitate the description herein. As indicated below, an "imbalance" in pipe wall thicknesses of 5% is enough to negatively affect the accuracy of a clamp-on ultrasonic flow meter.

Figure 7:
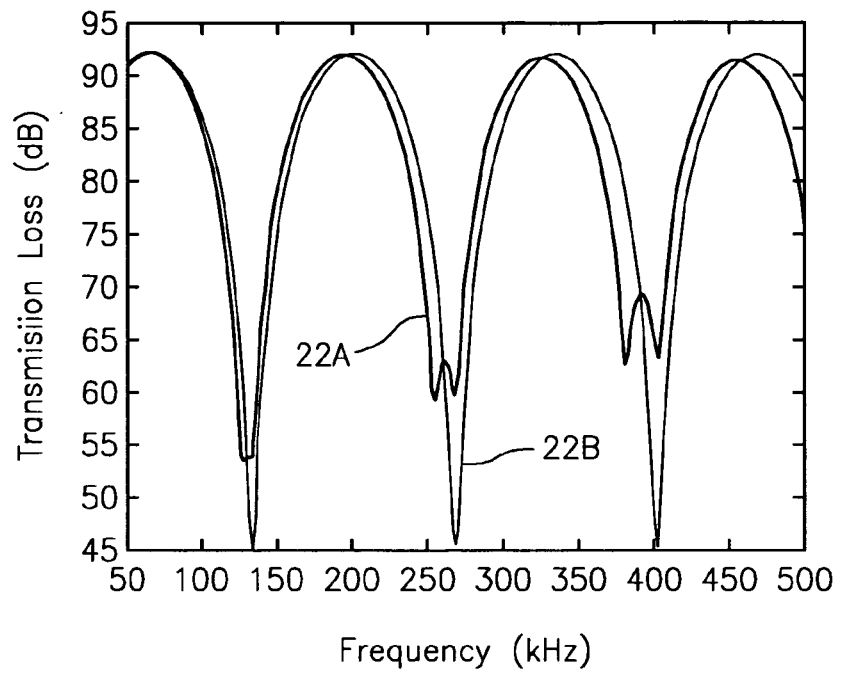
FIG. 7 is a graph of signal transmission loss versus frequency, depicting signal transmission loss for signals transmitted through the sensor-pipe wall arrangement shown in FIG. 6 on a pipe having imbalanced pipe wall thicknesses.

As shown in FIG. 7, the minimum transmission loss of the unbalanced pipe 22A is significantly higher than that of the balanced pipe 22B. An "imbalance" in pipe wall thickness of approximately 5% is well within normal pipe tolerances and is not atypical of conditions encountered in well heads on other clamp-on flow metering applications. The impact of this imbalance increases with each "half wave" resonant frequency, and therefore the difference in resonant frequencies between the two pipe walls. Using the given example pipe wall imbalance of approximately 5%, the penalty in transmission loss for the pipe wall imbalance approaches 10 dB for the first "half wave" resonant frequency, 15 dB for the second "half wave" resonant frequency, and 20 db for the third "half wave" resonant frequency. This increase in signal transmission loss is highly undesirable for clamp-on normal ultrasonic flow meters, and will, to some degree, negatively impact performance of the meters.

The present invention is directed toward creating an acoustically "balanced pipe" wherein the ultrasonic signal passing through the transmit wall structure has a "half wave" resonant frequency that coincides with the "half wave" resonant frequency of the receive wall structure. The term "coincide" as used herein is defined as "substantially equal". For example, if a signal is transmitted at a first frequency that is a "half wave" resonant frequency for the transmit wall structure, and the balanced pipe configuration of the present invention (detailed below) produces a receive wall structure having a "half wave" resonant frequency that is substantially equal to that of the transmit wall structure, such that the difference in signal transmission loss between the two wall structures is insubstantial, then the frequencies may be considered to coincide. The term "wall structure" is used herein to refer to the pipe wall and acoustic member(s) (e.g., shim, acoustic high impedance member, etc.), where such acoustic member is used.

Figure 8:
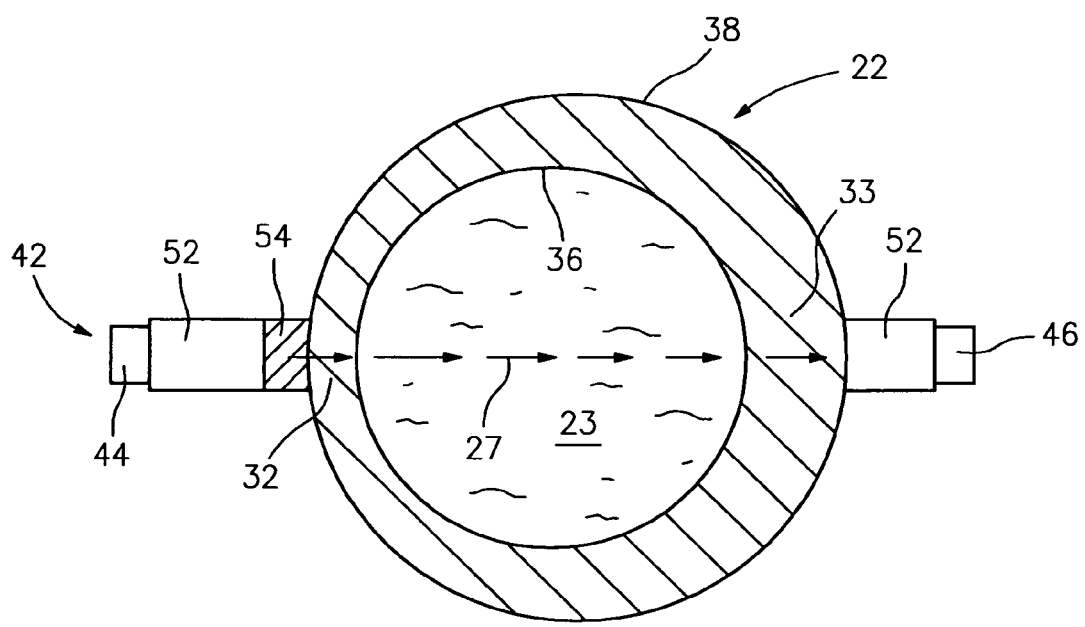
FIG. 8 is a diagrammatic illustration of a sensor mounted on a pipe like that shown in FIG. 6; i.e., the first and second pipe walls are not substantially equal in thickness. A shim is mounted between the shoe and the first pipe wall.

Now referring to FIG. 8, in a first embodiment of the present invention, an acoustic member is utilized with at least one of the walls (i.e., transmit wall 32 or receive wall 33) to create an acoustically "balanced" pipe; e.g., a shim 54 is disposed between a shoe 52 and the transmit wall 32, and as a result the "half wave" resonant frequencies of the transmit wall 32 coincide with the "half wave" resonant frequencies of the receive wall 33. The shim 54 (although there may be more than one) may be made of a material having properties (e.g., density, speed of sound, etc.) similar to the material of the pipe 22. The material properties and the thickness of the shim 54 causes the coincidence between the resonant frequencies; e.g., if the shim 54 has the same material properties as the pipe 22, the shim 54 can have a thickness that is substantially equal to the difference in thickness between the transmit wall 32 and the receive wall 33. As a result, the transmit wall 32 and the receive wall 33 are the same thickness for acoustic purposes, have the same acoustic properties, and therefore have coincident "half wave" resonant frequencies.

The shim(s) 54 aligns the "half wave" resonant frequencies of the pipe walls 32, 33. As indicated above, the shim 54 can be made of material this is relatively similar to the material of the pipe 22, but is not limited to such a material. A wide range of metals, for example, are available that would be acoustically suitable to balance steel pipes.

The thickness of the shim 54 is a function of the acoustic properties of the shim 54 material compared to the pipe 22 material. A single shim 54 disposed relative to one of the pipe walls 32, 33 does not necessarily have to have a thickness equal to the difference between the thicknesses of the transmit wall 32 and the receive wall 33. The shim 54 can have any thickness that, when disposed relative to the respective wall 32, 33, makes the respective pipe wall structure have "half wave" resonant frequencies coincident with the "half wave" resonant frequencies of the other wall. The present invention is not limited to disposing one or more shims 54 relative to only one of the pipe walls. One or more shims 54 can be disposed relative to both pipe walls 32, 33 to create transmit and receive wall structures that have coincident "half wave" resonant frequencies; e.g., see FIG. 11.

Under a method embodiment of the present invention, material can be removed from one of the pipe walls 32, 33 (e.g., the thicker of the two walls) or can be added to one of the pipe walls 32, 33 (e.g., the thinner of the two walls), or some combination of both, to create transmit and receive wall structures that have coincident "half wave" resonant frequencies.

The shim(s) 54 can be mechanically, magnetically, or adhesively attached to the pipe 22. Acoustically coupling the shim 54 to the pipe 22 (e.g., with an acoustic couplant 56) helps to effectively shift the "half wave" resonant behavior of the pipe 22.

Figure 9:
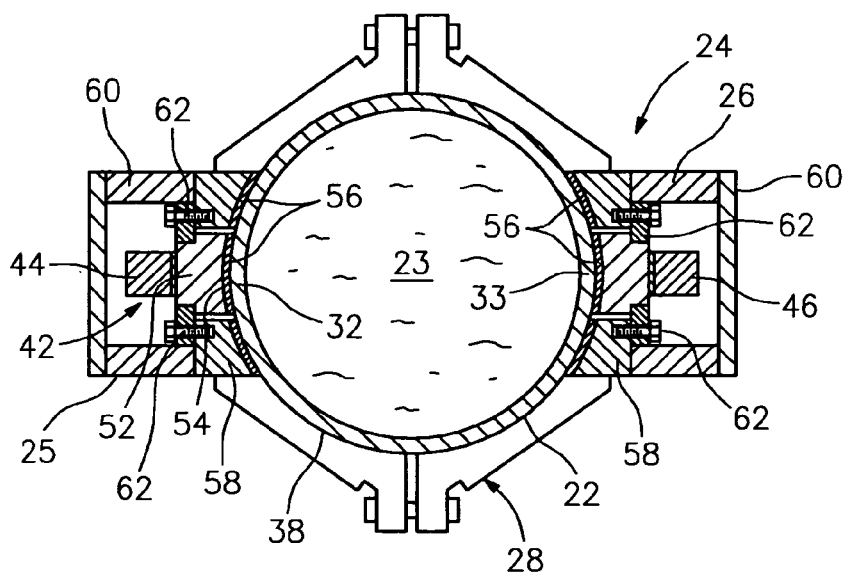
FIG. 9 is a diagrammatic illustration of a flow meter system which includes structure for mechanically attaching an acoustic member, such as a shim, onto the pipe.

FIG. 9 illustrates an embodiment of a flow meter 24 which includes structure for mechanically attaching the sensors 42 and shims 54 onto the pipe 22. The flow meter 24 includes a transmitter housing 25 and a receiver housing 26 clamped onto opposite sides of the pipe 22 via mounting hardware 28. Each housing 25, 26 includes a base 58 and a cover 60. Each base 58 includes a pocket for receiving the respective transmitter 44 or receiver 46 of a sensor 42, and is connectable to mounting hardware 28 adapted to mount the base 58 relative to the exterior of a pipe 22. A shim 54 is clamped between the exterior surface 38 of the pipe wall 32 (i.e., the transmit wall 32) and a shoe 52 (e.g., made of ultem) using the mounting hardware 28 that secures the shoe 52 and the shim 54 to the exterior surface 38 of the pipe 22. Specifically, the mounting hardware 28 includes brackets 62 configured to clamp the shoe 52 and shim 54 to the exterior surface of the pipe 22, and thereby provide intimate contact between the pipe 22, shim 54, and shoe 52. An acoustic couplant 56 can be disposed between the relative interfaces to decrease acoustic impedance across the interface; e.g., between the shim 54 and the exterior surface 38 of the transmit wall 32. The present invention, however, is not limited to the above-described mounting embodiment, and shims 54 can be attached to the pipe 22 by alternative means.

Figure 10:
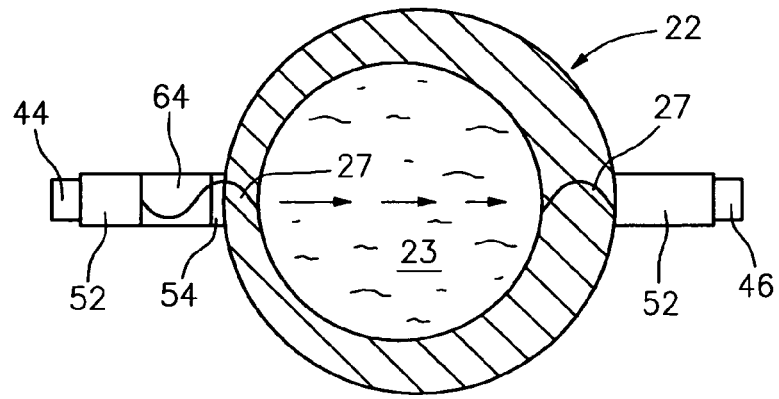
FIG. 10 is a diagrammatic illustration of a sensor mounted on a pipe having orthogonally opposed pipe walls with dissimilar thicknesses. An acoustic member in the form of an acoustic high impedance member is mounted between the shoe and a shim on the first pipe wall side.
Figure 11:
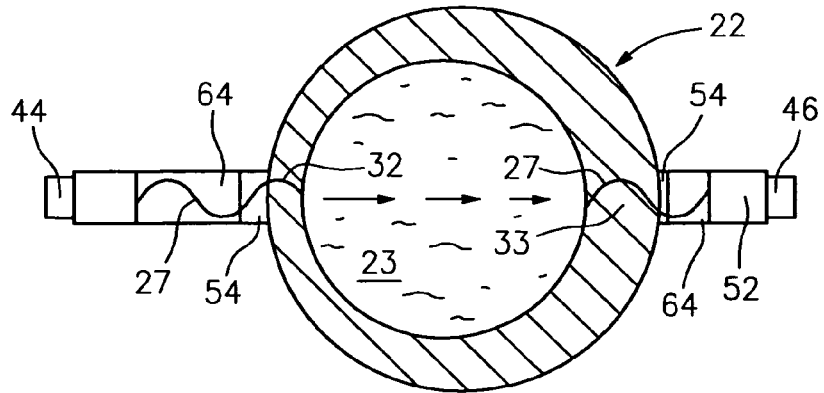
FIG. 11 is a diagrammatic illustration of a sensor mounted on a pipe having orthogonally opposed pipe walls with dissimilar thicknesses. Acoustic members in the form of acoustic high impedance members are mounted between the shoe and a shim on both sides of the pipe.

Referring to FIGS. 10 and 11, in some embodiments the acoustic member can take the form of an acoustic high impedance block 64 that creates resonant frequency coincidence between pipe wall sides. For example, one or more high impedance block(s) 64 can be utilized to create a "half wave" resonant frequency match of an Nth order harmonic of the transmit wall 32 side of the pipe 22 to a "half wave" resonant frequency of the same or a different harmonic of the receive wall 33 side of the pipe 22. In FIG. 10, for example, a high impedance block 64 is disposed on the transmit wall 32 side of the pipe 22. The high impedance block 64 is adapted such that the "half wave" resonant frequency of a second order harmonic of the transmit wall structure (collectively, the transmit wall 32, the shim 54 and the high impedance block 64) matches the "half wave" resonant frequency of a first order harmonic of the receive wall 33. Specifically, the high impedance block 64 is sized such that the transmit wall structure is approximately twice as thick as the receive wall 33. The size of the high impedance block 64, however, may be varied depending on the acoustic characteristics of the material from which it is composed. Each acoustic high impedance block 64 can be made from a material (e.g., steel) having properties (e.g., density, speed of sound, etc.) similar to the material of the pipe 22. In preferred embodiments, each acoustic high impedance block 64 is disposed between a shim 54 and a shoe 52; however, the present invention is not limited to this configuration. For example, where the pipe 22 is already acoustically "balanced", the shim(s) 54 can be omitted.

Figure 12:
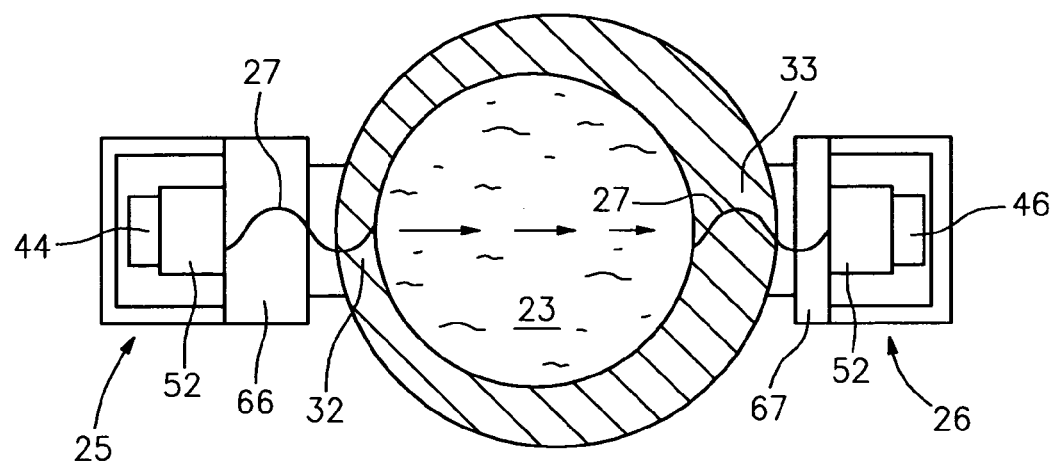
FIG. 12 is a diagrammatic representation of a flow sensor disposed within a housing attached to a pipe wall, wherein the base wall of an enclosure portion on each side of the pipe is adapted to function as an acoustic high impedance member.

Now referring to FIG. 12, in some embodiments the base wall 66, 67 of an enclosure 25, 26 (e.g., a pressure vessel adapted to withstand high levels of external pressure, for example, such as those experienced in subsea environments) can be adapted to function as a high impedance block similar to those shown in FIGS. 10 and 11.

In the embodiment diagrammatically shown in FIG. 11, a high impedance block 64 is disposed on both the transmit wall side and the receive wall side of the pipe 22. The high impedance blocks 64 are adapted such that the "half wave" resonant frequency of a third order harmonic of the transmit wall structure matches the "half wave" resonant frequency of a second order harmonic of the receive wall structure. In the embodiment in FIG. 12, the high impedance blocks (i.e., the bases 66, 67 of the enclosures 25, 26) are adapted such that the "half wave" resonant frequency of a second order harmonic of the transmit wall side matches the half wave resonant frequency of a second order harmonic of the receive wall side.

Although this invention has been shown and described with respect to the detailed embodiments thereof, it will be understood by those skilled in the art that various changes in form and detail may be made without departing from the spirit and scope of the invention.

What is claimed:

1. A method of sensing a fluid flow within a pipe, which pipe has a first wall oppositely disposed from a second wall, the method comprising the steps of:
   providing an ultrasonic sensor having a transmitter operable to transmit ultrasonic signals through the first pipe wall, the fluid flow disposed within the pipe, and the second pipe wall, and a receiver operable to receive the transmitted signal after the signal has passed through the first and second pipe walls and the fluid flow disposed within the pipe;
   wherein the first wall has one or more first half wave resonant frequencies, and the second wall has one or more second half wave resonant frequencies;
   disposing the transmitter adjacent the first wall and the receiver adjacent the second wall;
   disposing at least one acoustic member between at least one of the transmitter and the first wall, and the receiver and the second wall, which acoustic member has acoustic properties such that the combined respective member and pipe wall have half wave resonant frequencies that substantially match the half wave resonant frequencies of the opposite wall, or opposite wall and respective member; and
   sensing the fluid flow through the pipe walls and structure using the ultrasonic sensor.

2. The method of claim 1, wherein the acoustic member is a shim.

3. The method of claim 1, wherein the step of disposing at least one acoustic member includes disposing a first acoustic member between the transmitter and the first wall, and a second acoustic member between the receiver and the second wall, which acoustic members each have acoustic properties such that the combined respective acoustic member and pipe wall have half wave resonant frequencies that substantially match the half wave resonant frequencies of the opposite wall and respective acoustic.

4. The method of claim 3, wherein the first acoustic member is a shim and the second acoustic member is a shim.

5. The method of claim 2, further comprising the step of determining a thickness of the first pipe wall and a thickness of the second pipe wall; and wherein the pipe is comprised of a material having acoustic properties, and the shim comprises a material having acoustic properties substantially the same as the acoustic properties of the pipe, and the method further comprising the step of sizing the shim substantially equal to a difference between the thicknesses of the first pipe wall and the second pipe wall.

6. The method of claim 1, wherein the acoustic member is an acoustic high impedance block.

7. The method of claim 6, wherein the acoustic high impedance block is configured to create a half wave resonant frequency match of an Nth order harmonic of the first wall of the pipe to a half wave resonant frequency of the same or a different harmonic of the second wall of the pipe.

8. The method of claim 1, wherein the sensor is one of a plurality of ultrasonic sensors within an ultrasonic flow meter, and wherein the step of sensing the fluid flow through the pipe walls and structure uses the ultrasonic flow meter.

9. A method of sensing a fluid flow within a pipe, which pipe has a first wall oppositely disposed from a second wall, the method comprising the steps of:
   providing an ultrasonic sensor having a transmitter operable to transmit ultrasonic signals through the first pipe wall, the fluid flow disposed within the pipe, and the second pipe wall, and a receiver operable to receive the transmitted signal after the signal has passed through the walls and the fluid flow;

disposing the transmitter so that signals emitted from the transmitter enter the first wall as normal incident ultrasonic signals, which first wall has a thickness aligned with the transmitter;

disposing the receiver orthogonally across the pipe to receive the emitted signals through the second wall, which second wall has a thickness aligned with the receiver;

equalizing the thicknesses of the first and second walls where aligned with the transmitter and receiver, respectively; and sensing the fluid flow within the pipe using the transmitter and the receiver.

10. The method of claim 9, wherein the step of equalizing the thicknesses includes removing material from one of the first wall or second wall to substantially equalize the wall thicknesses.

11. The method of claim 9, wherein the step of equalizing the thicknesses includes adding material from one of the first wall or second wall to substantially equalize the wall thicknesses.

12. The method of claim 9, wherein the sensor is one of a plurality of ultrasonic sensors within an ultrasonic flow meter, and wherein the step of sensing the fluid flow through the pipe walls and structure uses the ultrasonic flow meter.

13. An apparatus for sensing a fluid flow within a pipe, which pipe has a first wall oppositely disposed from a second wall, which first wall has one or more first half wave resonant frequencies, and the second wall has one or more second half wave resonant frequencies, the apparatus comprising:

an ultrasonic sensor having a transmitter operable to transmit ultrasonic signals through the first pipe wall, fluid flow disposed within the pipe, and the second pipe wall, and a receiver operable to receive the transmitted signal after the signal has passed through the first and second pipe walls and the fluid flow disposed within the pipe; and at least one acoustic member adapted to be disposed between at least one of the transmitter and the first wall, and the receiver and the second wall, which acoustic member has acoustic properties such that the combined respective acoustic member and pipe wall have half wave resonant frequencies that substantially match the half wave resonant frequencies of the opposite wall, or opposite wall and respective member.

14. The apparatus of claim 13, wherein the at least one acoustic member includes a first acoustic member adapted to be disposed between the transmitter and the first wall, and a second acoustic member adapted to be disposed between the receiver and the second wall, which first and second acoustic members each have acoustic properties such that the combined respective acoustic member and pipe wall have half wave resonant frequencies that substantially match the half wave resonant frequencies of the opposite wall and respective acoustic member.

15. The apparatus of claim 14, wherein the first acoustic member is a shim and the second acoustic member is a shim.

16. The apparatus of claim 13, wherein the pipe is comprised of a material having acoustic properties, and the first wall has a thickness and the second wall has a thickness, and wherein the acoustic member is a shim comprised of a material having acoustic properties substantially the same as the acoustic properties of the pipe, and the shim has a thickness substantially equal to a difference between the thicknesses of the first wall and the second wall.

17. The apparatus of claim 1, wherein the acoustic member is an acoustic high impedance block.

18. The apparatus of claim 17, wherein the acoustic high impedance block is configured to create a half wave resonant frequency match of an Nth order harmonic of the first pipe wall side of the pipe to a half wave resonant frequency of the same or a different harmonic of the second pipe wall side of the pipe.

19. The apparatus of claim 13, wherein the sensor is one of a plurality of ultrasonic sensors within an ultrasonic flow meter.

20. The apparatus of claim 17, wherein the acoustic high impedance block is a base for a receiver housing or a transmitter housing.

* * * * *